US012585764B2

(12) United States Patent
West et al.

(10) Patent No.: US 12,585,764 B2
(45) Date of Patent: Mar. 24, 2026

(54) MALICIOUS BEHAVIOR DETECTION AND MITIGATION IN A DOCUMENT EXECUTION ENVIRONMENT

(71) Applicant: DocuSign, Inc., San Francisco, CA (US)

(72) Inventors: Nicholas William West, Redmond, WA (US); Brian Yeckley, Chicago, IL (US); Abhijit Salvi, Cupertino, CA (US); Taiga Matsumoto, Redmond, WA (US); Glenn Doren, Seattle, WA (US); Alexander Gregory Silverman, Seattle, WA (US); Roshan Satish, Seattle, WA (US); Michael Anthony Palazzolo, Seattle, WA (US)

(73) Assignee: Docusign, Inc., San Francisco, CA (US)

( * ) Notice: Subject to any disclaimer, the term of this patent is extended or adjusted under 35 U.S.C. 154(b) by 0 days.

(21) Appl. No.: 18/355,825

(22) Filed: Jul. 20, 2023

(65) Prior Publication Data

US 2023/0367874 A1     Nov. 16, 2023

Related U.S. Application Data

(63) Continuation of application No. 16/854,802, filed on Apr. 21, 2020, now abandoned.

(51) Int. Cl.
*G06F 21/55*          (2013.01)
*G06F 21/56*          (2013.01)

(52) U.S. Cl.
CPC .......... *G06F 21/554* (2013.01); *G06F 21/567* (2013.01); *G06F 2221/034* (2013.01)

(58) Field of Classification Search
CPC . G06F 21/554; G06F 21/567; G06F 2221/034
See application file for complete search history.

(56) References Cited

U.S. PATENT DOCUMENTS

| 8,549,643 B1 | 10/2013 | Shou |
| 8,607,353 B2 | 12/2013 | Rippert, Jr. et al. |
| 8,997,219 B2 | 3/2015 | Staniford et al. |
| (Continued) | | |

OTHER PUBLICATIONS

Advisory Action from U.S. Appl. No. 16/854,802 dated May 19, 2023, 5 pp.

(Continued)

*Primary Examiner* — Carl G Colin
*Assistant Examiner* — Zhe Liu
(74) *Attorney, Agent, or Firm* — Shumaker & Sieffert, P.A.

(57)          ABSTRACT

A document execution engine that receives a document for execution within a document execution environment. The document execution engine may also detect activity within the document execution environment associated with the received document, and apply the trained machine learned model to the detected activity to determine if the detected activity is representative of malicious behavior and, in response to determining that the detected activity is representative of malicious behavior, to identify remedial actions that can mitigate the malicious behavior. The document execution engine may also provide, to a device of a user, a recommendation to perform the identified remedial actions.

20 Claims, 4 Drawing Sheets

(56) References Cited

U.S. PATENT DOCUMENTS

| | | | |
|---|---|---|---|
| 9,021,352 B2* | 4/2015 | Goel | G06F 40/10 715/277 |
| 9,634,875 B2 | 4/2017 | Porat | |
| 10,430,570 B2 | 10/2019 | Gonser et al. | |
| 10,949,852 B1 | 3/2021 | Kramme et al. | |
| 11,170,104 B1 | 11/2021 | Stickle et al. | |
| 2003/0159048 A1* | 8/2003 | Matsumoto | G06F 21/645 713/178 |
| 2008/0114710 A1 | 5/2008 | Pucher et al. | |
| 2010/0064369 A1 | 3/2010 | Stolfo et al. | |
| 2011/0040784 A1* | 2/2011 | Rousseau | H04L 9/3297 707/769 |
| 2013/0254111 A1 | 9/2013 | Gonser et al. | |
| 2013/0305101 A1* | 11/2013 | Gupta | G06F 21/56 714/47.3 |
| 2015/0150090 A1* | 5/2015 | Carroll | G06F 21/64 726/3 |
| 2015/0222667 A1 | 8/2015 | Nayshtut et al. | |
| 2016/0092682 A1* | 3/2016 | Adams | G06F 21/56 726/23 |
| 2016/0179776 A1* | 6/2016 | Bartley | G06Q 20/027 715/268 |
| 2017/0041296 A1* | 2/2017 | Ford | G06F 21/64 |
| 2017/0171240 A1* | 6/2017 | Arzi | H04L 63/1416 |
| 2018/0034642 A1* | 2/2018 | Kaehler | H04L 9/14 |
| 2018/0191770 A1 | 7/2018 | Nachenberg et al. | |
| 2018/0205546 A1* | 7/2018 | Haque | H04L 9/3213 |
| 2018/0239959 A1 | 8/2018 | Bui et al. | |
| 2018/0276390 A1* | 9/2018 | Grafi | H04L 9/14 |
| 2019/0332619 A1 | 10/2019 | De Sousa Webber | |
| 2019/0356641 A1* | 11/2019 | Isaacson | H04L 9/3231 |
| 2020/0074515 A1* | 3/2020 | Ghatage | G06F 40/58 |
| 2020/0311646 A1 | 10/2020 | Koenig et al. | |
| 2020/0322351 A1 | 10/2020 | Jadav et al. | |
| 2020/0351285 A1 | 11/2020 | Eisenkot et al. | |
| 2021/0012020 A1* | 1/2021 | Malton | G06F 21/554 |
| 2021/0029164 A1 | 1/2021 | Albero et al. | |
| 2021/0029170 A1 | 1/2021 | Gupta et al. | |
| 2021/0036867 A1* | 2/2021 | Attard | G06Q 10/10 |
| 2021/0042180 A1 | 2/2021 | Sutton et al. | |
| 2021/0182388 A1* | 6/2021 | Myneni | G06N 5/04 |
| 2021/0209708 A1 | 7/2021 | Admon | |

OTHER PUBLICATIONS

Buczak et al., "A Survey of Data Mining and Machine Learning Methods for Cyber Security Intrusion Detection", IEEE Communications Surveys & Tutorials, vol. 18, No. 2, IEEE, Oct. 2015, pp. 1153-1176.

Final Office Action from U.S. Appl. No. 16/854,802 dated Feb. 21, 2023, 25 pp.

Final Office Action from U.S. Appl. No. 16/854,802 dated Feb. 22, 2022, 22 pp.

Maiorca et al., "A structural and content-based approach for a precise and robust detection of malicious PDF files", 2015 International Conference on Information Systems Security and Privacy (ICISSP), Feb. 2015, pp. 27-36.

Office Action from U.S. Appl. No. 16/854,802 dated Oct. 25, 2021, 17 pp.

Office Action from U.S. Appl. No. 16/854,802 dated Sep. 20, 2022, p. 24.

Response to Final Office Action dated Feb. 22, 2022 from U.S. Appl. No. 16/854,802, filed May 17, 2022, 12 pp.

Response to Office Action dated Oct. 25, 2021 from U.S. Appl. No. 16/854,802, filed Jan. 10, 2022, 11 pp.

Response to Office Action dated Sep. 20, 2022 from U.S. Appl. No. 16/854,802, filed Dec. 1, 2022, p. 12.

Response to Office Action dated Feb. 21, 2023 from U.S. Appl. No. 16/854,802, filed Apr. 21, 2023, p. 15.

* cited by examiner

Machine Learned Model
Training Phase

Access training set representative of incidents of malicious behavior
and remedial actions taken in response
410

Train machine learned model with accessed training set
420

Receive documents for execution within document execution
environment
430

Detect activity associated with organization relevant to received
documents
440

Apply trained machine learned model to detected activity to identify
malicious behavior and corresponding remedial actions
450

Recommend remedial actions to user
460

FIG. 4

MALICIOUS BEHAVIOR DETECTION AND MITIGATION IN A DOCUMENT EXECUTION ENVIRONMENT

This application is a continuation of U.S. patent application Ser. No. 16/854,802, filed Apr. 21, 2020, the entire contents of which is incorporated by reference.

TECHNICAL FIELD

The disclosure generally relates to the field of document execution, and specifically to detecting and preventing malicious behavior in a document execution environment.

BACKGROUND

An entity may provide or create a document for execution within an online document execution environment (or simply "online document system"). Since online environments are subject to malicious threats and activity, the document within the document execution environment may be at risk for corruption and/or exploitation. Such threats may be associated with compromised accounts, may be geographically centered, and may be associated with particular activities within the document execution environment. Thus, there is a need for a system that identifies and acts in response to such malicious activity.

SUMMARY

A method for detecting and preventing malicious behavior in a document execution environment is disclosed. The method accesses a training set of information that represents incidents of malicious behavior in the document execution environment as well as remedial actions taken in response to the incidents that resulted in some level of mitigation of the malicious behavior. The method trains a machine learned model based on the training set of information such that the trained machine learned model is configured to detect malicious behavior based on activity that occurs within the document execution environment and recommend remedial actions in response. The method receives a document for execution, detects activity associated with the document, and applies the trained machine learned model to the detected activity. The trained machine learned model determines whether the detected activity represents malicious behavior and identifies remedial actions that can mitigate the malicious behavior. The method subsequently provides, to a device of a user, a recommendation to perform the identified remedial actions. In some embodiments, a system and/or a non-transitory computer readable storage medium performs the steps described above.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4 illustrates an example process for detecting and preventing malicious behavior in a document execution environment, in accordance with one or more embodiments.

DETAILED DESCRIPTION

Figure 1:
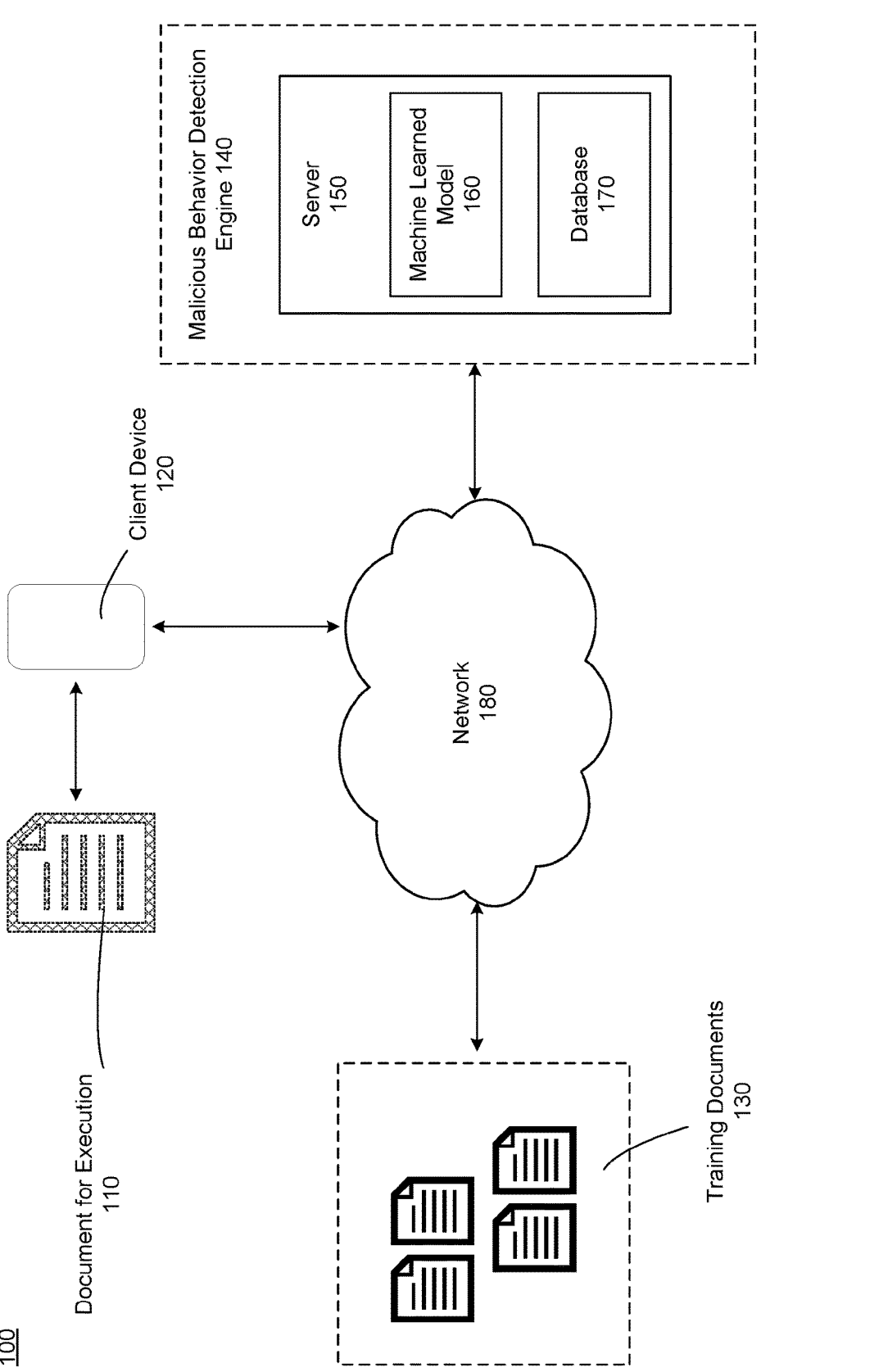
FIG. 1 illustrates an example document execution environment in which malicious behavior can be detected and prevented, in accordance with one or more embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Document Execution Environment Overview

The methods described herein use machine learning to detect and prevent malicious behavior in a document execution environment. A document execution environment enables a party (e.g., individuals, organizations, etc.) to create and send documents to one or more receiving parties for negotiation, collaborative editing, and electronic execution (e.g., signature). Within the document execution environment, a receiving party may review content and/or terms presented in a document, and in response to agreeing to the content and/or terms, can execute the document. In some embodiments, the receiving party provides the sending party (e.g., the party that created and sent the document for execution) with feedback on the content and/or terms in the document received for execution. In some embodiments, the receiving party completes and/or contributes to a portion of the content and/or terms in the document. Additionally, the sending party may access and/or share data associated with the document within the document execution environment, such as a time and location at which the receiving party accesses, views, and/or executes the document. In some embodiments, the document execution environment enables payments between the receiving and sending parties. DocuSign, Inc's e-Signature product is an example functionality that is implemented within a document execution environment. A document execution environment and example functionality is further described in U.S. Pat. No. 9,634,875, issued Apr. 25, 2017, and U.S. Pat. No. 10,430,570, issued Oct. 1, 2019, which are hereby incorporated by reference in their entireties.

While the document execution environment described herein implements security measures to help ensure the security and confidentiality of documents sent to receiving parties for execution, threats to online environments more generally increasingly occur. Thus, documents created, collaboratively modified, and sent for execution are also at risk for malicious behavior and corruption. The methods and systems described herein help ensure timely detection of such malicious activity associated with documents within a document execution environment, and help provide recommendations for remedial actions that, when performed, help mitigate any detected malicious activity.

FIG. 1 illustrates an example document execution environment 100 in which malicious behavior can be detected and prevented, in accordance with one or more embodiments. As described above, the document execution environment 100 enables a sending party to create and send documents for execution to one or more receiving parties. The receiving parties may review, modify, and execute the documents. The document execution environment 100 uses a machine learned model to detect activity associated with a document sent for execution that be indicative of malicious behavior. As illustrated in FIG. 1, the document execution environment includes a document for execution 110, a client device 120, a set of training documents 130, and a malicious behavior detection engine 140, each communicatively interconnected via a network 180. In some embodiments, the document execution environment includes components other than those described herein. For the purposes of concision, the web servers, data centers, and other components associated with an online document execution environment are not shown in the embodiment of FIG. 1.

The document for execution 110 is analyzed for associated activity that is indicative of malicious behavior. Examples of documents for execution include but are not limited to: a sales contract, a permission slip, a rental and/or lease agreement, a liability waiver, a financial document, an investment term sheet, a purchase order, an employment agreement, a mortgage application, and so on. The document execution environment 100 receives the document for execution 110 from the sending party via the client device 120 (or receives instructions to create the document within the document execution environment 100 from the client device 120) and provides it to the receiving party (not illustrated in the embodiment of FIG. 1), for instance for signing.

The client device 120 provides the document for execution 110 to the document execution environment 100. The client device 120 is a computing device capable of transmitting and/or receiving data over the network 190. The client device 120 may be a conventional computer (e.g., a laptop or a desktop computer), a cell phone, or a similar device. The client device 120 enables a user (e.g., of the sending party) to create and/or provide the document for execution 110 to the document execution environment 100. After the document execution environment 100 determines that some activity associated with the document for execution 110 is malicious, the client device 120 notifies the user of the malicious behavior and/or provides, to the user, recommended remedial actions. In some embodiments, the client device 120 notifies the user of recommended remedial actions based on user input specifying types of malicious behavior and/or recommended actions that warrant notifications. In some embodiments, the client device 120 includes a user interface that displays the detected malicious activity and recommended remedial actions.

Incidents and/or activity associated with the training documents 130 serve as a training set of information for training the machine learned model to detect malicious behavior and/or suggest recommended remedial actions. In some embodiments, one or more users responsible for creating and/or managing the training documents 130 manually curate and/or provide the malicious incidents and activity to the document execution environment 100. Remedial actions, associated with the training documents 130, taken in response to each of the malicious incidents and/or activity are also added to the training set of information. For example, the training set of information can include historical documents associated with the document execution environment 100, historical activity and/or incidents that have been identified as malicious, historical remedial actions taken by other users in response to the malicious activity and/or incidents, and measures of mitigation representative of the effectiveness of the historical remedial actions taken.

The malicious behavior detection engine 140 detects malicious behavior within the document execution environment 100 associated with the document for execution 110 using a machine learned model 160 and in response, recommends remedial actions to a user of the client device 120. The malicious behavior detection engine 140 includes a server 150, which hosts and/or executes a machine learned model 160 and a database 170.

The server 150 stores and receives information from the document execution environment 100. The server 150 may be located on a local or remote physical computer and/or may be located within a cloud-based computing system. The server 150 receives, from the client device 120, the document for execution 110 and/or any associated activity or incidents that have occurred within the document execution environment 100. The activity associated with the document for execution 110 may occur in devices other than the client device 120. As mentioned above, while the user of the client device 120 may have access to the associated activity, the activity may be performed by client devices of the receiving party of the document for execution 110 or by a third-party, and therefore may not occur on the client device 120. It should be noted that in some embodiments, the document for execution 110 is provided to and stored by a system other than server 150—in these embodiments, the malicious behavior detection engine 140 can implement one or more monitoring routines configured to monitor activity associated with the document and/or with the system that stores the document.

The machine learned model 160 is configured to detect malicious behavior based on activity associated with the document for execution 110 within the document execution environment 100. In some embodiments, the machine learned model 160 is further configured to identify remedial actions that may mitigate the detected malicious behavior. The machine learned model 160 is trained on a training set of information. The training set of information includes incidents representative of malicious behavior in the document execution environment 100, remedial actions taken in response to the incidents, and resulting levels of mitigation of the malicious behavior. After being trained, the machine learned model 160 is applied to the detected activity associated with the document for execution 110. The machine learned model 160 can then output information indicating whether the activity is likely malicious behavior or not. In some embodiments, in response to identifying malicious behavior, the machine learned model 160 also outputs recommendations of remedial actions that, when performed, may help mitigate or end the malicious behavior. The training and application of the machine learned model 160 is further discussed with respect to FIG. 2.

The database 170 stores information relevant to the malicious behavior detection engine 140. The stored data includes, but is not limited to, the document for execution 110, activity associated with the document for execution 110, the training set of information, the training documents 130, and so on. In some embodiments, the database 170 stores information representative of detected activity determined to be malicious and detected activity determined not to be malicious, representative of remedial actions taken in response to activity determined to be malicious, and representative of the mitigation of such remedial actions. The malicious behavior detection engine 140 can add such information to the training set of information, and can retrain the machine learned model 160 based on this information.

The network 180 transmits data within the document execution environment 100. The network 180 may be a local area and/or wide area network using wireless and/or wired communication systems, such as the Internet. In some embodiments, the network 180 transmits data over a single connection (e.g., a data component of a cellular signal, or WiFi, among others), and/or over multiple connections. The network 180 may include encryption capabilities to ensure the security of customer data. For example, encryption technologies may include secure sockets layers (SSL), transport layer security (TLS), virtual private networks (VPNs), and Internet Protocol security (IPsec), among others.

Training and Application of Machine Learned Model

Figure 2:
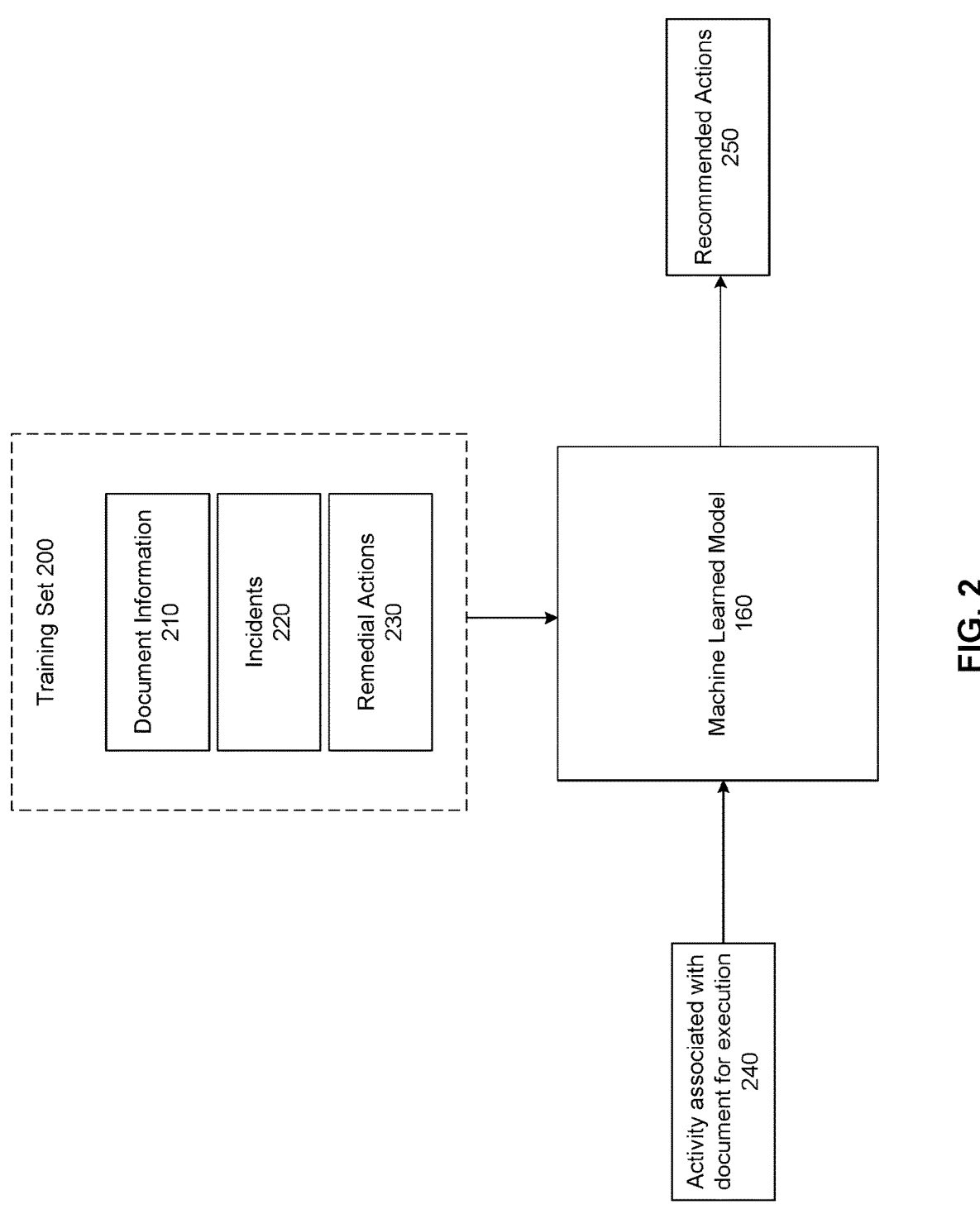
FIG. 2 illustrates training and applying a machine learning model configured to detect and prevent malicious behavior in the document execution environment, in accordance with one or more embodiments.

FIG. 2 illustrates training and applying the machine learning model 160 configured to detect and prevent malicious behavior in the document execution environment 100, in accordance with one or more embodiments. As described with respect to FIG. 1, the machine learning model 160 takes, as input, information representative of activity within the document execution environment 100 associated with the document for execution 110 to determine whether the activity is indicative of malicious behavior. Based on the information representative of the activity associated with the document, the machine learning model 160 outputs a likelihood that the activity is indicative of malicious behavior, and (if the likelihood exceeds a threshold) the machine learning model 160 provides recommendations on remedial actions that may mitigate the malicious behavior.

The malicious behavior detection engine 140 trains the machine learned model 160 using a training set of information 200 (e.g., "the training set 200"). The training set 200 includes document information 210 (e.g., information about the training documents 130), information representative of activity within the document execution environment 100 determined to be malicious and activity determined to not be malicious ("incidents 220"), and remedial actions 230 (e.g., actions taken in response to incidents identified as malicious behavior). In some embodiments, the training set 200 additional includes measures of mitigation resulting from the remedial actions 230 (not illustrated in FIG. 2). The document information 210, the incidents 220, the remedial actions 230, and the measures of mitigation may be provided via client devices to the document execution environment 100. In other embodiments, the document execution environment 100 may automatically collect the document information 210, the incidents 220, the remedial actions 230, and/or the measures of mitigation to add to the training set 200. In other embodiments, a user of the document execution environment 100 may manually input or curate a subset of the document information 210, the incidents 220, the remedial actions 230, and/or the measures of mitigation to the training set 200. It should be noted that the information included in the training set 200 may be representative of historical documents, activity, malicious behavior, remedial actions, and measures of mitigation within the document execution environment 100.

The document information 210 includes information characterizing each of the training documents 130. For example, for each of the training documents 130, the document information 210 includes a type of the document, size of the document, languages within the document, region in which the document originated, characteristics associated with the sending and receiving party of the document (e.g., size, industry, location of headquarters, revenue, corporate structure), types or categories of information or passages within the document, and the like.

The incidents 220 include activity associated with each of the training documents 130 that has occurred within the document execution environment 100. The incidents 220 may correspond to content or actions taken with regards to content of the training documents 130, such as the modification, addition, and/or removal of any terms and/or conditions in the document; dates recited in the document; parties designated for execution of the document; discrepancies between the document and other similar documents; and on the like. The incidents 220 may also correspond to the management of =the training documents 130 within the document execution environment 100. These include, for each of the training documents 130, modifying, adding, and/or removing parties and administrators that can access, view, and/or edit the document and associated documents; modifying permissions associated with document; downloading, exporting, and/or sending the document to another party; modifying account credentials or security requirements necessary to access and/or edit the document (e.g., requiring two factor authentication); log in attempts, successes, and failures to access, view and/or modify the document execution environment 100; modifying, removing, and/or adding an email of an administrator and/or party that can access, view and/or edit the document; modifying, adding, and/or removing recovery instructions and/or notifications in case the document is deleted; modifying integrations with other documents and/or partnering products compatible with the document execution environment 100; modifying, creating, and/or removing a template for the document; a time, geographic location, and/or IP address at which the document is accessed and/or executed; a network and/or device from which the document is accessed and/or executed; a number of devices accessing and/or executing the document concurrently and/or within a threshold of time of one another; an amount and/or time of payment corresponding to access and/or execution of the document; and the like.

The incidents 220 can be classified as malicious or non-malicious behavior based on the document information 210, for instance by users of the document execution environment 100, by network administrators, by security personnel, automatically (for instance by algorithm), or any entity associated with a document or the document execution environment. The classification of normal (e.g., non-malicious) behavior may depend on the document information 210. For example, a time between the access and execution of a 10-page document may take longer than the time between the access and execution of a 1-page document. Accordingly, users may classify an above-threshold amount of time between the access and execution of the 1-page document as representative of malicious behavior. In another example, a licensing agreement sent to a 500+ person company may require more signatories than the same licensing agreement sent to a company with less than 50 employees. Similarly, users may designate access to the document in a geographic region where neither the sending nor the receiving party have any employees as malicious behavior. Accordingly, the document information 210 can be leveraged to determine whether detected activity is normal or malicious behavior for the document and the parties involved.

The remedial actions 230 include actions taken in response to malicious behavior determined from the incidents 220. The remedial actions 230 include, for the training documents 130 associated with malicious activity, restoring a deleted document within the document execution environment 100, providing a document to additional individuals from the receiving party for additional review and/or signatures, limiting access to the document, deleting and/or suspending an account of a suspicious user associated with the document, notifying an entity (such as the receiving party, the sending party, an account manager, or a network administrator) of the malicious behavior, and the like. Additional examples of remedial behavior include increasing the security requirements or access criteria for the document, revoking privileges (such as edit privileges, signing privileges, and the like) of parties associated with the document, limiting a number of documents a party can access or a number of actions a party can take for parties associated with the document, implementing one or encryption or encoding protocols for the document, disabling access to or one or more actions that can be taken on a document for a threshold amount of time or for a particular time interval, disabling access to one or more actions that can be taken on a document for parties within a particular geographic region, limiting access or action privileges for one or more client devices or user accounts, and the like. In some embodiments, the remedial policies 230 are associated with a resulting measure of mitigation. In some embodiments, the measure of mitigation is determined based on the document information 210. For example, suspending an account of a suspicious user may be most effective for a document found to have been accessed in a region where no employees of both the sending and the receiving party are located. For a document with an abnormal review time before execution, sending the document for additional review may be sufficient. In some embodiments, the measures of mitigation are determined based on feedback from a sending and/or receiving party of the document, from an account or network manager, automatically by algorithm, based on a change in activity corresponding to the malicious behavior, or based on any other suitable criteria. The measures of mitigation can be represented numerically, for instance, as a likelihood that the remedial action ended the malicious behavior, categorically (e.g., "successful", "partially successful", "not successful"), or in any other suitable way.

In some embodiments, the remedial actions 230 include preventative measures, specific to the document information 210, to prevent malicious behavior. For example, preventative measures may include identifying times at which activities within the document execution environment 100 may be indicative of malicious behavior, but in reality, are not. These include, for example, high activity periods (e.g., a time of year during which the execution of documents occurs rapidly) and management periods (e.g., a time at which an administrator of the receiving or sending party is likely to delete or modify a large number of documents within the document execution environment 100). In another example, the preventative measures include monitoring and flagging activity within a geographic region identified as a location associated with prior malicious activity. In some embodiments, the preventative measures include performing the remedial actions 230 prior to detecting the incidents 220 that are representative of malicious behavior. For example, administrators of the sending party of the document may require additional review prior to an individual from the receiving party signing the document.

The training set 200 may be separated into a positive training set and negative training set. The positive training set includes the document information 210 associated with the incidents 220 that are designated (for instance, by the users of the document execution environment 100) as malicious behavior, as well as the associated remedial actions 230 taken in response to the malicious incidents 220. The negative training set includes the document information 210 associated with the incidents 220 that are designated as non-malicious. In some embodiments, the negative training set includes the preventative measures from the remedial actions 230.

The malicious behavior detection engine 140 uses supervised or unsupervised machine learning to train the machine learned model 160 using the positive and negative training sets of the training set 200. Different machine learning techniques may be used in various embodiments, such as linear support vector machines (linear SVM), boosting for other algorithms (e.g., AdaBoost), neural networks, logistic regression, naïve Bayes, memory based learning, random forests, bagged trees, decision trees, boosted trees, or boosted stumps. The training of the machine learned model 160 helps the machine learned model 160 identify relationships between the document information 210, the incidents 220, and the remedial actions 230. In other words, training the machine learned model 160 enables the machine learned model 160 to identify the relationships between activity within the document execution environment 100, documents within the document execution environment 100, and remedial actions taken in order to classify subsequent activity as malicious and to recommend remedial actions to take in response.

The trained machine learned model 160, when applied to detected activity 240 associated with the document for execution 110, determines whether the activity 240 is representative of malicious behavior and outputs recommended actions 250 that will help mitigate the malicious behavior. In some embodiments, the trained machine learned model 160 determines a likelihood that the activity 240 is malicious, or determines a likelihood that the activity 240 is one or more of a set of different types of malicious behavior, and selects one or more remedial actions in response to one or more of the determined likelihoods exceeding a threshold. The activity 240 associated with the document for execution 110 may be substantially similar to any of the incidents 220 in the training set 200. Likewise, the recommended actions 250 may be substantially similar to any of the remedial actions 230 of the training set 200. In response to determining that the activity 240 is malicious (or exceeds a malicious likelihood threshold), the trained machine learned model 160 notifies the user of the client device 120 of identified malicious behavior and/or the recommended remedial actions 250. The malicious behavior detection engine 140 may automatically perform the recommended actions 250 to mitigate the threat presented by the detected malicious behavior associated with the activity 240. In some embodiments, the malicious behavior detection engine 140 automatically performs the recommended actions 250 after determining that the identified activity 240 is above a threshold level of severity or risk and/or after a passage of a threshold amount of time without the user to whom the actions are recommend performing the actions. The threshold level of severity or risk may be specified by the user of the client device 120.

The trained machine learned model 160 notifies the user of the client device 120 of the malicious behavior and/or the recommended actions 250. In some embodiments, the user provides feedback on whether the behavior determined by the machine learned model 160 to be malicious is accurate or not, which is subsequently added to the training set 200 for re-training of the machine learned model 160. In some embodiments, the user can manually re-define types of malicious activity 240, threshold amounts of activity that qualify as malicious, types of remedial actions that can be recommended, and the like to the malicious behavior detection engine 140 for re-training the machine learned model.

The malicious behavior detection engine 140 may present the notifications to the user via the display of the client device 120. The display of the client device 120 includes a user interface including interface elements for each of the recommended actions 250; when selected by the user, each interface element causes the corresponding recommended action 250 to be automatically performed. In some embodiments, each recommended action 250 is displayed with a likelihood that the action will resolve or address the identified malicious behavior. The likelihoods are determined based on measures of mitigation associated with similar actions in the training set 200.

Example Detected Activity within Document Execution Environment

Figure 3:
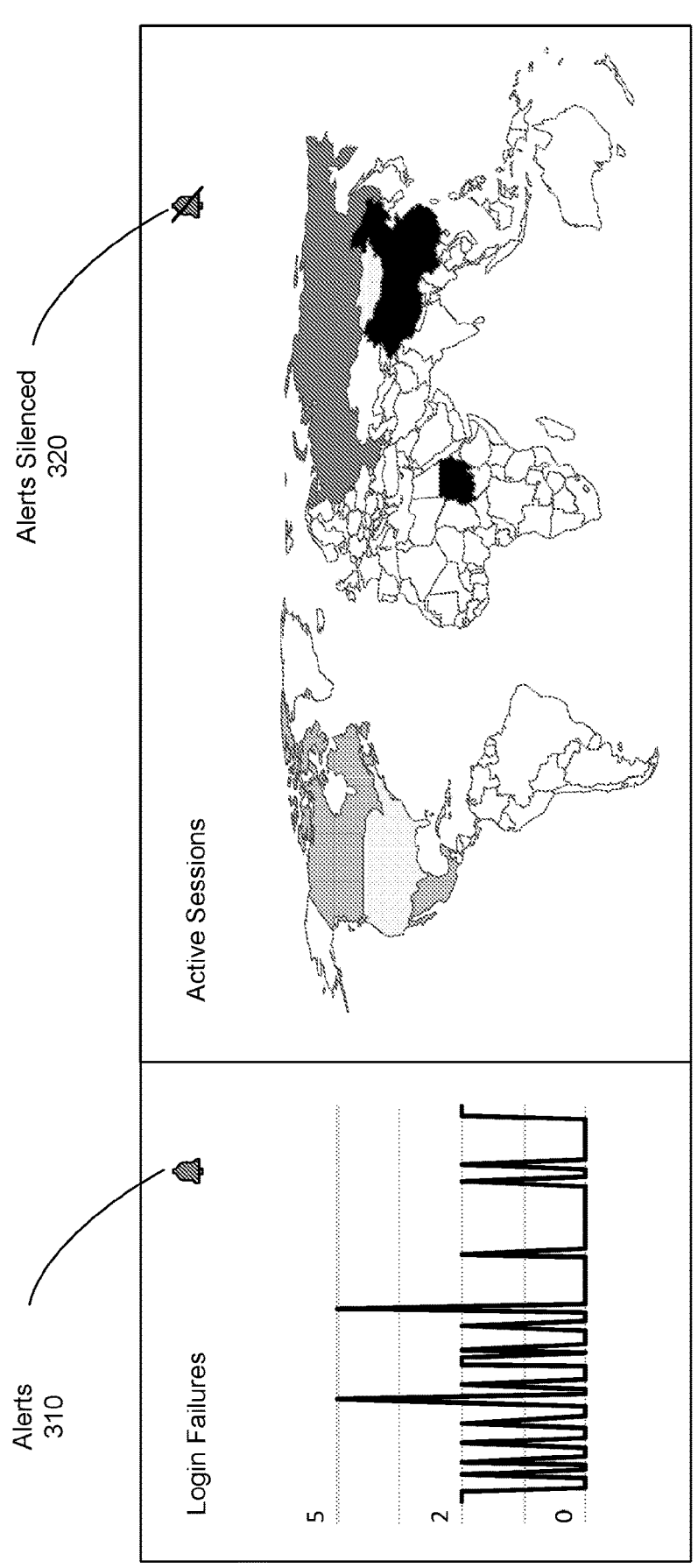
FIG. 3 illustrates example detected activity that may be representative of malicious behavior in the document execution environment, in accordance with one or more embodiments.

FIG. 3 illustrates example detected activity (e.g., the activity 240) that may be representative of malicious behavior in the document execution environment 100, in accordance with one or more embodiments. After the detected activity is input to the machine learned model 160 and the machine learned model 160 classifies the detected activity as indicative of malicious behavior, the user can confirm whether the activity is indeed indicative of malicious behavior and whether the user wants notifications of the detected activity. In FIG. 3, an interface of the document execution environment 100 shows two types of detected activity: login failures and active sessions, accessible and viewable by users with access to the document execution environment 100. As mentioned with respect to FIG. 2, users may choose types of activity to be notified about. In this particular example, the user has selected alerts 310 for login failures but silenced alerts 320 for active sessions. Accordingly, the machine-learned model 160 classifies more than 3 login failures within a predetermined time interval as malicious, and notifies the user of the detected malicious activity. Likewise, the machine-learned model classifies an above-threshold number of active sessions within a particular geographic region as malicious, but doesn't notify the user of the detected malicious activity originating from China, Sudan, and Russia. Similarly, recommended actions to mitigate detected malicious behavior (e.g., the recommended actions 250) may be presented via the same interface or a different interface of the document execution environment 100.

Process for Detecting and Mitigating Malicious Behavior

FIG. 4 illustrates an example process for detecting and preventing malicious behavior in a document execution environment, in accordance with one or more embodiments. A malicious behavior detection engine of the document execution environment accesses 410 a training set including (for example) information representative of malicious and non-malicious activity within the document execution environment associated with one or more documents, information representative of a set of training documents, and remedial and/or preventative actions (taken in response to detected malicious behavior. In some embodiments, the training set also includes a measure of mitigation achieved by performing the remedial actions and/or a measure of prevention achieved by performing the preventative actions.

The malicious behavior detection engine trains 420 a machine learned model using the training set. The machine learned model determines relationships between documents, activity, and remedial actions within the document execution environment. For instance, the machine learned model may be a convolutional neural network that, when applied to subsequent activity (such as a pattern of failed login attempts from a particular geographic region) associated with a document within the document execution environment, can output a likelihood that the activity is malicious.

The malicious behavior detection engine receives 430 a document for execution. For instance, the document can be a contract or employment agreement uploaded to the document execution environment by a client device. Likewise, the document can be created and collaboratively modified within the document execution environment by a number of parties.

The malicious behavior detection engine detects 440 activity within the document execution environment associated with the document. The document execution environment applies 450 the trained machine learned model to characteristics of the detected activity to determine whether the activity is likely malicious behavior. If the activity is determined to be malicious, The malicious behavior detection engine recommends 460 the remedial actions to the user, who may perform the remedial actions.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving a document for execution within a document execution environment;
detecting activity within the document execution environment associated with the received document to obtain a detected activity, wherein the detected activity includes an amount of time between accessing the document and execution of the document within the document execution environment;
applying a trained machine learned model to the detected activity to determine if the detected activity is representative of malicious behavior and, in response to determining that the detected activity is representative of malicious behavior, to identify one or more remedial actions that can mitigate the malicious behavior,
wherein applying the trained machine learning model comprises:
applying, the trained machine learning model to the amount of the the time to determine a likelihood that the amount of the time is indicative of malicious behavior; and
applying a threshold to the likelihood that the amount of the time to identify the one or more remedial actions, wherein the threshold is determined based on a length of the document; and
providing, to a device of a user, a recommendation to perform the identified one or more remedial actions.

2. The method of claim 1, wherein detecting the activity associated with the received document further comprises:
identifying a party that created the document for execution;
detecting the access to the document by a second party;
detecting the execution of the document by the second party; and
determining a time of the execution.

3. The method of claim 2, wherein detecting the activity associated with the received document further comprises:
determining a geographic location associated with the detected access of the document by the second party; or
determining a geographic location associated with the detected execution of the document by the second party.

4. The method of claim 1, wherein detecting the activity associated with the received document further comprises:
identifying a type of the document;
accessing a second document of the same type; and comparing the document and the second document for variability.

5. The method of claim 1, wherein detecting the activity associated with the received document further comprises identifying changes made to content of the document.

6. The method of claim 1, wherein detecting the activity associated with the received document comprises:
identifying a payment associated with the execution of the document; and
identifying the amount of the payment.

7. The method of claim 1, wherein detecting the activity associated with the received document further comprises detecting a deletion of the document or content within the document from the document execution environment.

8. The method of claim 1, wherein the recommendation identifies the document for execution and a type of the detected activity determined to be malicious.

9. The method of claim 1, wherein the one or more identified remedial actions comprise at least one of:
in response to detecting a deletion of the document for execution, restoring the document within the document execution environment;
providing the document for execution to additional signatories; and
limiting access to the document within the document execution environment.

10. The method of claim 1, wherein at least one type of detected activity representative of malicious behavior is defined by the user.

11. The method of claim 10, wherein the at least one type of detected activity representative of malicious behavior defined by the user comprises a threshold amount of the at least one type of detected activity.

12. The method of claim 1, wherein the device of the user comprises:
an interface on which the recommendation is displayed, the interface comprising:
for each of the one or more identified remedial actions, an interface element that, when selected by the user, causes at least one identified remedial action of the one or more identified remedial actions to be performed.

13. Non-transitory computer readable storage media comprising instructions that when executed by one or more processors causes the one or more processors to:
receive a document for execution within the document execution environment;
detect activity within the document execution environment associated with the received document to obtain a detected activity, wherein the detected activity includes an amount of time between accessing the document and execution of the document within the document execution environment;
applying a trained machine learned model to the detected activity to determine if the detected activity is representative of malicious behavior and, in response to determining that the detected activity is representative of malicious behavior, to identify one or more remedial actions that can mitigate the malicious behavior,
wherein applying the trained machine learning model comprises:
applying, the trained machine learning model to the amount of the the time to determine a likelihood that the amount of the time is indicative of malicious behavior; and
applying a threshold to the likelihood that the amount of the time to identify the one or more remedial actions, wherein the threshold is determined based on a length of the document; and providing, to a device of a user, a recommendation to perform the identified one or more remedial actions.

14. The non-transitory computer readable storage media of claim 13, wherein detecting the activity associated with the received document corresponds to instructions that further cause the processors to:

identify a party that created the document for execution;

detect the access to the document by a second party;

detect the execution of the document by the second party; and determine a time of the execution.

15. The non-transitory computer readable storage medium of claim 13, wherein detecting the activity associated with the received document corresponds to computer executable code that further causes the processors to:

identify changes made to content of the document.

16. The non-transitory computer readable storage medium of claim 13, wherein detecting the activity associated with the received document corresponds to computer executable code that causes the processors to:

identify a payment in conjunction with the execution of the document; and identify an amount of the payment.

17. The non-transitory computer readable storage medium of claim 13, wherein the one or more remedial actions comprise at least one of:

in response to detecting a deletion of the document for execution, restore the document within the document execution environment;

providing the document for execution to additional signatories; and limiting access to the document execution environment.

18. The non-transitory computer readable storage medium of claim 13, wherein at least one type of detected activity representative of malicious behavior is defined by the user.

19. The non-transitory computer readable storage medium of claim 18, wherein the at least one type of detected activity representative of malicious behavior defined by the user comprises a threshold amount of the at least one type of detected activity.

20. A computer system comprising:

one or more processors; and a non-transitory computer readable storage medium comprising instructions that when executed by the one or more processors causes the one or more processors to:

receive a document for execution within a document execution environment; detect activity within the document execution environment associated with the received document to obtain a detected activity, wherein the detected activity includes an amount of time between accessing the document and execution of the document within the document execution environment;

apply a trained machine learned model to the detected activity to determine if the detected activity is representative of malicious behavior and, in response to determining that the detected activity is representative of malicious behavior, to identify one or more remedial actions that can mitigate the malicious behavior, wherein applying the trained machine learning model comprises:

applying, the trained machine learning model to the amount of the the time to determine a likelihood that the amount of the time is indicative of malicious behavior; and applying a threshold to the likelihood that the amount of the time to identify the one or more remedial actions, wherein the threshold is determined based on a length of the document; and provide, to a device of a user, a recommendation to perform the identified one or more remedial actions.

* * * * *